US012219225B2

(12) United States Patent
Doe et al.

(10) Patent No.: US 12,219,225 B2
(45) Date of Patent: Feb. 4, 2025

(54) CONTENT ENHANCER

(71) Applicant: XUMO LLC, Philadelphia, PA (US)

(72) Inventors: Christopher Mark Doe, Playa Del Rey, CA (US); Christopher Forrest Gordon, Newport Beach, CA (US)

(73) Assignee: XUMO LLC, Philadelphia, PA (US)

( * ) Notice: Subject to any disclaimer, the term of this patent is extended or adjusted under 35 U.S.C. 154(b) by 0 days.

(21) Appl. No.: 17/090,646

(22) Filed: Nov. 5, 2020

(65) Prior Publication Data

US 2021/0136465 A1    May 6, 2021

Related U.S. Application Data

(63) Continuation of application No. 14/828,228, filed on Aug. 17, 2015, now Pat. No. 10,834,480.

(60) Provisional application No. 62/038,167, filed on Aug. 15, 2014.

(51) Int. Cl.
*H04N 21/858*      (2011.01)
*H04N 9/82*        (2006.01)
*H04N 21/4722*     (2011.01)

(52) U.S. Cl.
CPC ......... *H04N 21/858* (2013.01); *H04N 9/8205* (2013.01); *H04N 21/4722* (2013.01)

(58) Field of Classification Search
CPC ............................................... G06F 17/30855
See application file for complete search history.

(56) References Cited

U.S. PATENT DOCUMENTS

| | | | |
|---|---|---|---|
| 9,094,677 B1 * | 7/2015 | Mendis | G02B 27/0176 |
| 9,423,925 B1 | 8/2016 | Rajaraman et al. | |
| 9,491,522 B1 * | 11/2016 | Trollope | H04N 21/436 |
| 2006/0133407 A1 | 6/2006 | Kuisma | |
| 2009/0049122 A1 * | 2/2009 | Wayne | H04N 21/2743 |
| | | | 709/203 |
| 2009/0164922 A1 | 6/2009 | Phakousonh et al. | |
| 2009/0187825 A1 * | 7/2009 | Sandquist | G06F 16/70 |
| | | | 715/719 |
| 2011/0041153 A1 * | 2/2011 | Simon | H04N 21/4532 |
| | | | 709/204 |
| 2012/0117488 A1 * | 5/2012 | Amidon | H04N 21/4622 |
| | | | 715/753 |
| 2012/0124604 A1 * | 5/2012 | Small | H04N 21/4223 |
| | | | 725/12 |
| 2012/0159327 A1 * | 6/2012 | Law | H04N 21/47217 |
| | | | 715/716 |
| 2013/0019173 A1 | 1/2013 | Kotler et al. | |
| 2013/0332835 A1 * | 12/2013 | Mace | H04N 21/4668 |
| | | | 715/720 |
| 2014/0330137 A1 * | 11/2014 | Banet | A61B 5/0205 |
| | | | 600/484 |
| 2015/0026573 A1 * | 1/2015 | Meng | G06F 8/61 |
| | | | 715/716 |
| 2015/0037009 A1 | 2/2015 | Wang | |

(Continued)

*Primary Examiner* — Di Xiao
(74) *Attorney, Agent, or Firm* — BakerHostetler (57) ABSTRACT

A method, apparatus, system, and computer program product provide the ability to enhance linear video content. Linear video content is received. A request to enhance the linear video content is received. Based on the request, a toolbar with options for enhanced content is rendered. One or more of the options are selected. Based on the selection, the enhanced content is invoked simultaneously with a rendering of the linear video content.

27 Claims, 6 Drawing Sheets

(56) References Cited

U.S. PATENT DOCUMENTS

2015/0245101 A1\* 8/2015 Stathacopoulos .......................... H04N 21/42201 725/61
2016/0048272 A1 2/2016 Doe et al.

\* cited by examiner

CONTENT ENHANCER

CROSS REFERENCE TO RELATED APPLICATIONS

This application is a continuation of U.S. patent application Ser. No. 14/828,228, filed Aug. 17, 2015, now U.S. Pat. No. 10,834,480, issued Nov. 10, 2020, which claims the benefit of U.S. Patent Application No. 62/038,167, filed Aug. 15, 2014, which are hereby incorporated by reference in their entireties.

BACKGROUND OF THE INVENTION

1. Field of the Invention

The present invention relates generally to multimedia, and in particular, to a method, apparatus, and article of manufacture for adding data, social streams, bonus footage, and interactivity to linear video content.

2. Description of the Related Art

Linear video content is commonly provided and/or delivered via a variety of transmission mediums (e.g., cable, satellite, fiber-optic, Internet, etc.). However, often times, linear video content (broadcast or otherwise) is static and does not provide an interactive element.

SUMMARY OF THE INVENTION

Embodiments of the invention add data, social streams, bonus footage, and interactivity to linear video content. The menu for enhancement can take the form of a popup, overlay, toolbar, or any other augmentation to the linear video.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Definitions

Multimedia Content

Multimedia (or multimedia content) refers to content that uses a combination of different content forms (contrasted with media that only uses a single content form). Multimedia may include a combination of two or more of the following: text, audio, still images, animation, video, interactivity, etc.

Linear Video Content

Multimedia may be broadly divided into linear and non-linear categories. Linear active content progresses sequentially often without any navigational control for the viewer such as a cinema presentation. Non-linear content uses interactivity to control progress as with a video game or self-paced computer based training. Hypermedia is an example of non-linear content. Broadcast television programming is an example of linear content. Linear video content refers to video content that progresses sequentially from frame-to-frame. While one can fast-forward and rewind linear video content to view a particular clip/frame, one may be prevented from advancing to a particular frame without progressing sequentially. Often times, linear video (or linear video content) may refer to the continuous playback of videotape, typically analog video technology (versus digital video technology that allows the user to jump to a particular frame without sequentially advancing through a tape or linear video sequence).

Hardware Environment

A variety of different hardware platforms may be utilized to deliver and view media content. Embodiments of the invention are intended to apply to all and/or a subset of such platforms. Several exemplary platforms are described herein but the invention is not limited to such platforms.

It may be useful to note that as used herein, the hardware platform includes several components: (1) the screen/monitor/display on which multimedia content is viewed (referred to as "display device"); (2) the hardware that receives the multimedia content from a source and formats/delivers the content to the display device (referred to as a "media receiver"); and (3) the transmission mechanism/distribution system for the multimedia content. It may also be noted that the functionality performed by each of the components may at times be performed by other components in the hardware platform. In addition, the components may be integrated together. For example, the display device may be integrated into and be part of the media receiver.

Embodiments of the invention may be utilized in the context of television viewing, web browsing, display of an app/application, and/or in any device/platform including cellular devices (e.g., cellular phones), personal digital assistants (PDAs), tablet computers (e.g., the iPad™ tablet), music players (e.g., MP3 players such as iPod™ music players), automobile displays (e.g., center console display), etc.

The display device may consist of traditional television display devices (e.g., LED [light emitting diode] televisions, plasma televisions, LCD [liquid crystal display], cathode ray tube [CRT] displays). Such traditional display devices may receive the multimedia content directly from a broadcast source (e.g., via an integrated antenna or via cable, wireless network, etc.) wherein the tuner/receiver is integrated into the display device. Alternatively, the display device may be connected to a tuner/receiver (e.g., a set top box) that receives the content, decodes the content, etc., for display on the display device. Such a set top box (STB) may receive the content via satellite, cable, broadcast, etc.

In one or more embodiments of the invention, the multimedia content may be viewed on a display device that receives the multimedia content via the Internet or broadband connection. In such an embodiment, the display device may be a computer monitor that receives the content from a computer via a user's broadband connection (e.g., to the Internet). Alternatively, a television itself may be "connected" to the Internet such that it is Internet-enabled. In alternative embodiments, the receiver that delivers content to a display device may consist of hardware/a media player specifically directed towards multimedia viewing (e.g., via a broadband connection). Examples of such devices include a Boxee device, an AppleTV™ device, a Google™ set-top box, a Roku™ television device, etc. Alternatively, the receiver may be a gaming/multimedia device such as an Apple Wii/WiiU™, Microsoft XBOX 360™ or XBOX One™, Sony Playstation™ PS4™, PS3™, etc. In yet another embodiment, the display device may consist of a cellular device/phone that receives media content via a cellular network (or via a wireless network connection). In yet another embodiment, the multimedia content may be displayed on a tablet device (e.g., IPad™) or a remote control unit (e.g., that has a display capability) that controls one or more devices.

Regardless of the display device utilized, the common component across all such display devices is each display device is configured to display multimedia content. While embodiments of the invention may be utilized in a variety of contexts and hardware platforms, as described above, exemplary platforms are illustrated in FIGS. 1 and 2.

Figure 1:
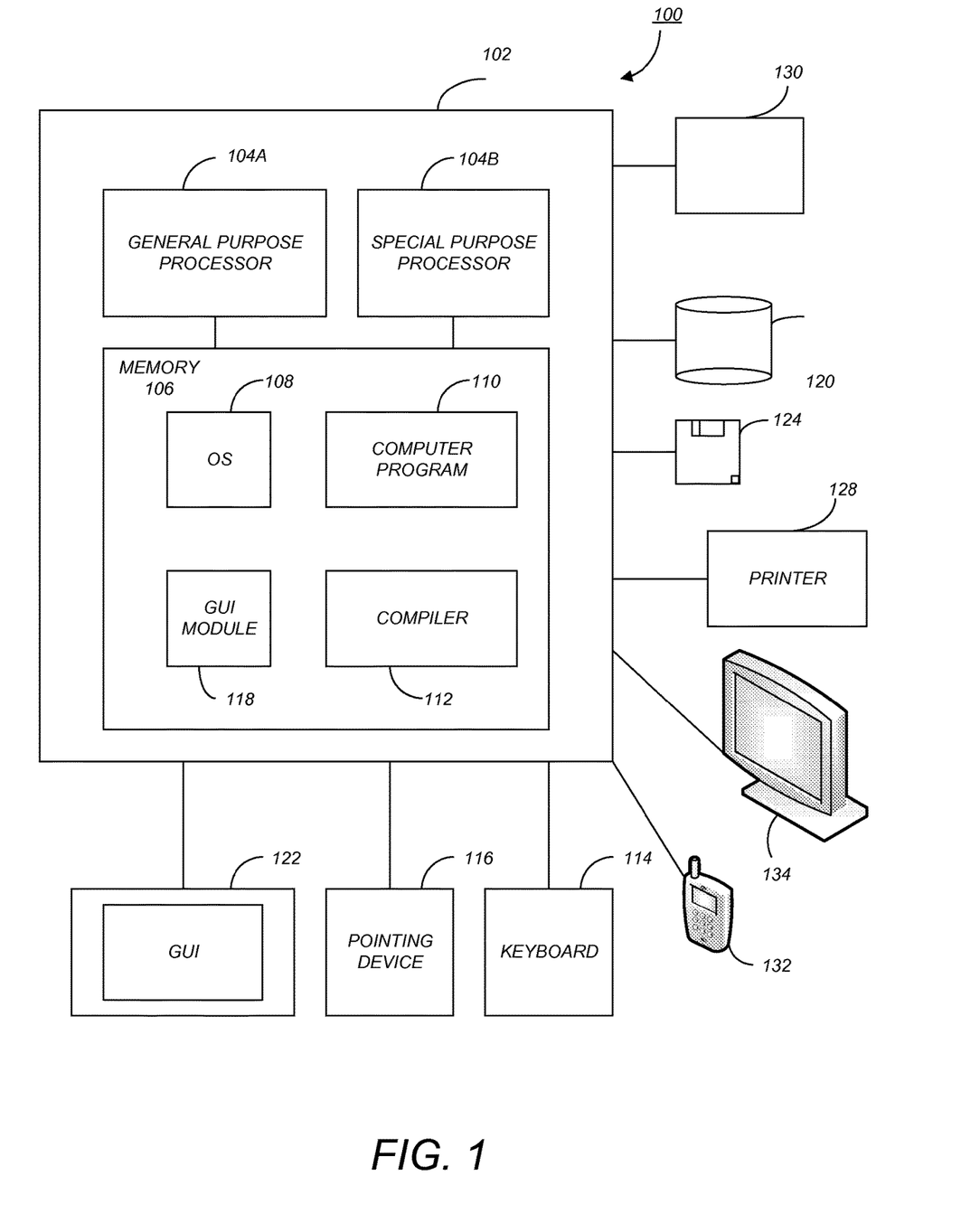
FIG. 1 is an exemplary hardware and software environment/platform 100 used to implement one or more embodiments of the invention.
Figure 2:
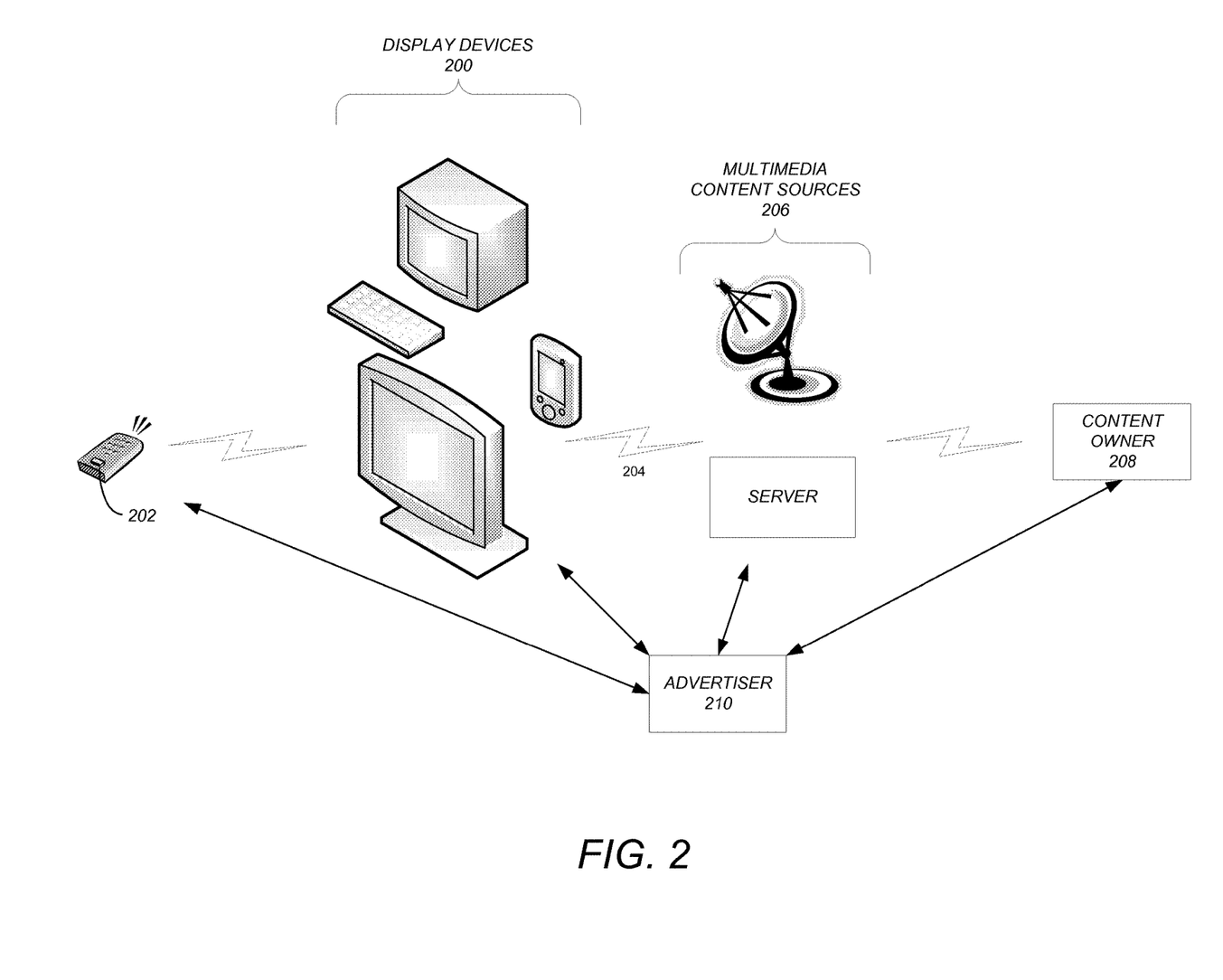
FIG. 2 illustrates the interaction between different components of the system/platform.

FIG. 1 is an exemplary hardware and software environment/platform 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128.

In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television 134, television set top box, or other internet enabled device 134 executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or may be provided to another device (e.g., device 134) for presentation or further processing or action. In one embodiment, the display 122/134 comprises a liquid crystal display (LCD) having a plurality of separately addressable liquid crystals. Alternatively, the display 122/134 may comprise a light emitting diode (LED) display having clusters of red, green and blue diodes driven together to form full-color pixels. Each liquid crystal or pixel of the display 122/134 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122/134 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™ Droid™ devices, etc.), tablet computers (e.g., iPad™, HP Touchpad™), portable/handheld game/music/video player/console devices (e.g., iPod Touch™, MP3 players, Nintendo 3DS™ PlayStation Portable™, etc.), touch tables, and walls (e.g., where an image is projected through acrylic and/or glass, and the image is then backlit with LEDs). Alternatively, display 122/134 may consist of a television display device that has a built in tuner/receiver or is connected to a set-top-box configured to receive multimedia content.

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and/or providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

FIG. 2 illustrates the interaction between different components of the system/platform. As illustrated, display devices 200 are used to display the multimedia content. Such display devices 200 include cellular devices, television monitors, computers, computer monitors, etc. The display/viewing of such multimedia content may be controlled via remote control 202 or other suitable device.

The display devices 200 receive the multimedia content across network 204 from media content sources 206. Network 204 may consist of a cellular network, satellite network, broadband network, or any type of network capable of transmitting media content. Such media content sources 206 may include broadcasters (e.g., one of the broadcast networks), multimedia content providers (e.g., a cable provider such as Comcast™, satellite provider such as DirecTV™, etc.), and/or computers (e.g., a server or other computer connected to display devices 200 and/or configured to receive content and deliver such content to display devices 200). Further, such computers may be configured to utilize a media player (e.g., Windows™ Media Player™, Quicktime™, etc.) to display media content on a display device 200.

Media content sources 206 may receive such content from content owners 208 (e.g., movie/television studios, private individuals, record companies, etc.).

Advertisements that are displayed in accordance with embodiments of the invention are received from advertiser 210. Advertiser 210 may communicate/transmit advertisements to any of the entities involved (e.g., content owner 208, media content sources 206, and/or display devices 200). As used herein, an advertiser may be an actual advertiser, an advertising network (e.g., Specific Media™), an advertising exchange, an advertising server, or any system or combination of systems that delivers an advertising creative to another system or device.

When advertiser 210 communicates with media content sources 206, the advertiser 210 may negotiate with media content sources 206 to determine the cost, length of time, etc. for placement of an advertisement. Thereafter, the advertisement may be inserted by media content sources 206 into the multimedia content. Alternatively, a placeholder may be specified in the multimedia content with the advertisement delivered to display devices 200 for delivery to the user/consumer. Consequently, advertisements may be integrated into the multimedia content or may be delivered separately from such multimedia content. Further, in different embodiments, each component (e.g., the content owner 208, media content sources 206, and/or display devices 200) may have the ability to control the advertisement that is displayed/delivered to a user/consumer.

Content Enhancer

Embodiments of the invention may be implemented as a software application (or hardware) executing on a display device 200, media receiver, content source 206 (e.g., a server), and/or on devices executed by a content owner 208 or advertiser 210.

Embodiments of the invention provide for a "content enhancer" that adds data, social streams, bonus footage, and interactive content to linear video content. The menu for the enhancement can take the form of a popup, overlay, toolbar, or any other augmentation to the linear video. Examples of such enhancements may include:

Data: Rotten Tomatoes reviews, IMDB™ (Internet Movie DataBase) cast information;

Web Content: maps, Twitter™ feeds, websites;

Social streams: Twitter™, Instagram™, Facebook™, or Myspace™ streams or search results; and Bonus Footage: director interview, alternative endings, etc. (things traditionally on a $2^{nd}$ DVD).

By providing enhanced content, linear video content becomes interactive and more engaging. Further, old content is given new life.

To provide such functionality, linear video may be augmented with a toolbar or an interactive kit.

Figure 3:
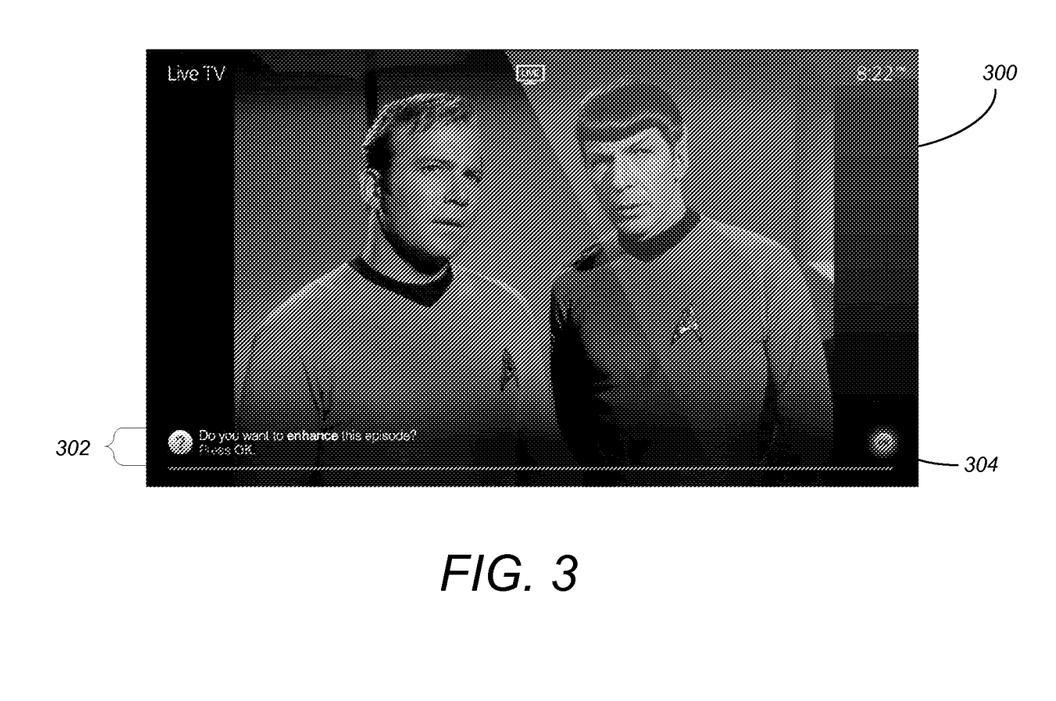
FIG. 3 illustrates a display of linear video content where the user is presented with an option regarding whether to enhance the video content or not in accordance with one or more embodiments of the invention.

FIG. 3 illustrates a display of linear video content where the user is presented with an option regarding whether to enhance the video content or not. In FIG. 3, the linear video content consists of a live television broadcast of a Star Trek™ episode. While playing the linear video sequence, embodiments of the invention may overlay a prompt asking if the user desires to enhance the particular episode being watched. The overlay prompt 302 provides "Do you want to enhance this episode? Press OK".

The display of overlay prompt 302 may be triggered dependent on the linear video content being displayed or may be independent of such content. For example, the prompt may only be displayed if enhanced content is currently available for the linear video content. Alternatively, the prompt may be displayed regardless of availability of such enhanced content (i.e., enhanced content such as a social media feed or hashtag may be created based on the user's response to the user prompt 302).

The prompt 302 may be displayed based on a marker (e.g., a watermark, fingerprint, or other point) within the linear video content. Alternatively, the prompt 302 may be displayed based on a detection that the user has been actively watching the linear video content for a predefined time period (e.g., 5 minutes, 20 minutes, an hour, etc.). The prompt 302 may also display based on prior user conduct (e.g., detection that the user has watched a particular television show or episode of a television show a particular number of times). Alternatively, the prompt 302 may display based on whether a user's friends within a social media network have also watched and/or have participated in a thread and/or utilized enhanced content related to the linear video content. As used herein, the invention is not intended to be limited to any particular trigger or activation of the user prompt 302.

Figure 4:
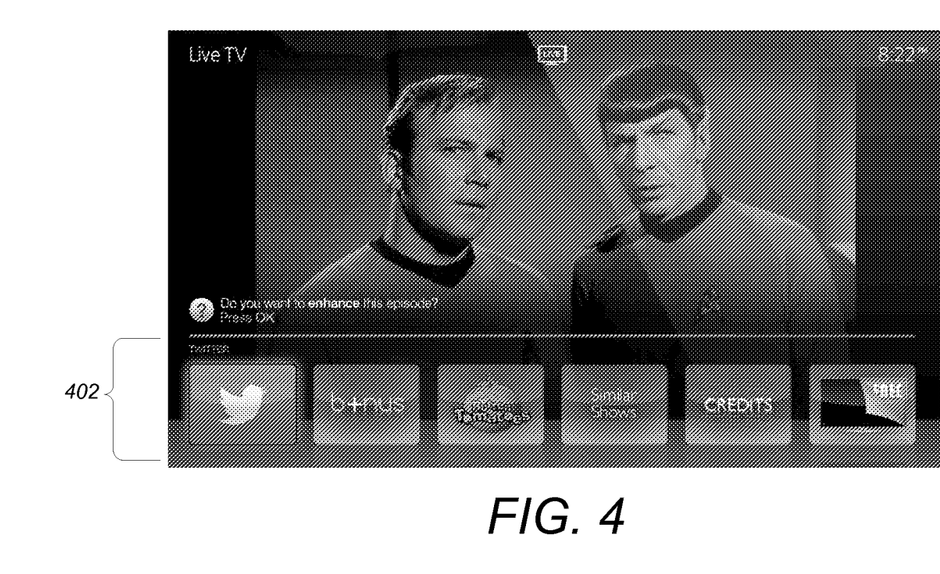
FIG. 4 illustrates a toolbar containing enhanced content options in accordance with one or more embodiments of the invention.

In response to prompt 302, if the user elects to press "ok" e.g., on a remote and or by tapping the touch screen at the ok icon 304, a toolbar 402 containing enhanced content options may be displayed as illustrated in FIG. 4. The toolbar may be overlaid on top of linear video content (e.g., with varying levels of transparency), and/or may display adjacent to and/or on a secondary device (e.g., on a tablet that is communicatively coupled to the display device that is displaying the linear video content).

Multiple different types of enhanced content options (represented by one or more icons) may be displayed within toolbar 402 for selection/activation by the user. The user can use the left and right arrows (or other input mechanisms) of a remote control (or a touch screen) to navigate within toolbar 402 and utilize the "ok" remote control button to select the desired enhanced content. For example, in FIG. 4, icons representing enhanced content for select Twitter™, bonus content, Rotten Tomatoes™ reviews, a listing of similar shows, credits, additional content (e.g., free content), etc. may be displayed. Further options may be available by via additional navigation within toolbar 402.

Upon selection of the desired enhanced content, the selected enhanced content or an application/app for such enhanced content may be displayed/invoked. The display of the enhanced content/application/app may be overlaid on top of the linear video content, may open in a separate window/tab, etc.

Figure 5:
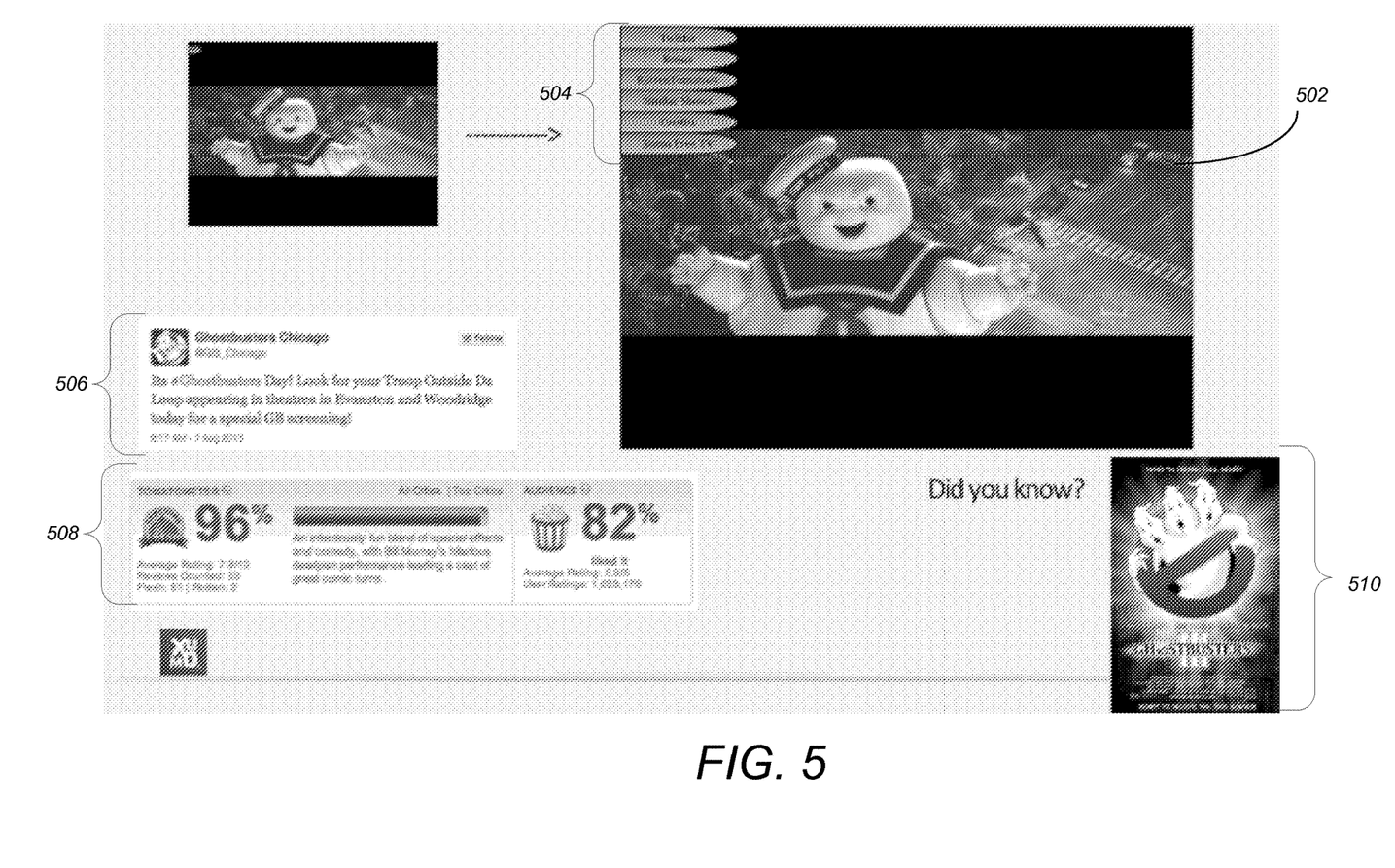
FIG. 5 illustrates an alternative graphical user interface where enhanced content has been added to old linear video content in accordance with one or more embodiments of the invention.

FIG. 5 illustrates an alternative graphical user interface where enhanced content has been added to old linear video content in accordance with one or more embodiments of the invention. As illustrated, a customizable toolbar may be added to provide a current conversation to old content (e.g., an old movie such as Ghostbusters III). When viewing the linear video content 502, the toolbar 504 may be overlaid on the content 502. Rather than displaying the toolbar 402 arranged along the bottom of the content as illustrated in FIG. 4, the toolbar 504 is displayed within different geometric shapes in the upper left corner. Icons or other selectable objects may be displayed within the scope of the invention. Enhanced content may provide for twitter information 506, Rotten Tomatoes™ reviews 508, other information 510, etc.

In view of the above, embodiments of the invention provide the ability for a content creator and/or user to create a customized toolbar that enables the use of enhanced content in association with already existing linear video content. The customization of the toolbar includes the location of the toolbar, transparency, appearance, number of items, navigation within the toolbar, actions invoked upon selection, etc. Further, such capabilities may be available to a user that is viewing such linear content (e.g., via an app on a cellphone, touch screen, tablet device, etc.). The viewer would have the capability to expose such enhanced content to a network of his/her friends, to the general public (e.g., by publishing their toolbar), etc. Further, embodiments of the invention may provide a service for uploading toolbars and/or associating such toolbars with media content in a library. For example, a service like iTunes™ may permit users to upload and make available toolbars that provide enhanced content in association with content hosted within the iTunes™ service. Such toolbars may be offered for sale or maybe provided for free. In addition, such toolbars may have to be approved by the content owner and/or hosting service prior to being made publicly available as part of a service (e.g., for a fee or otherwise).

Logical Flow

Figure 6:
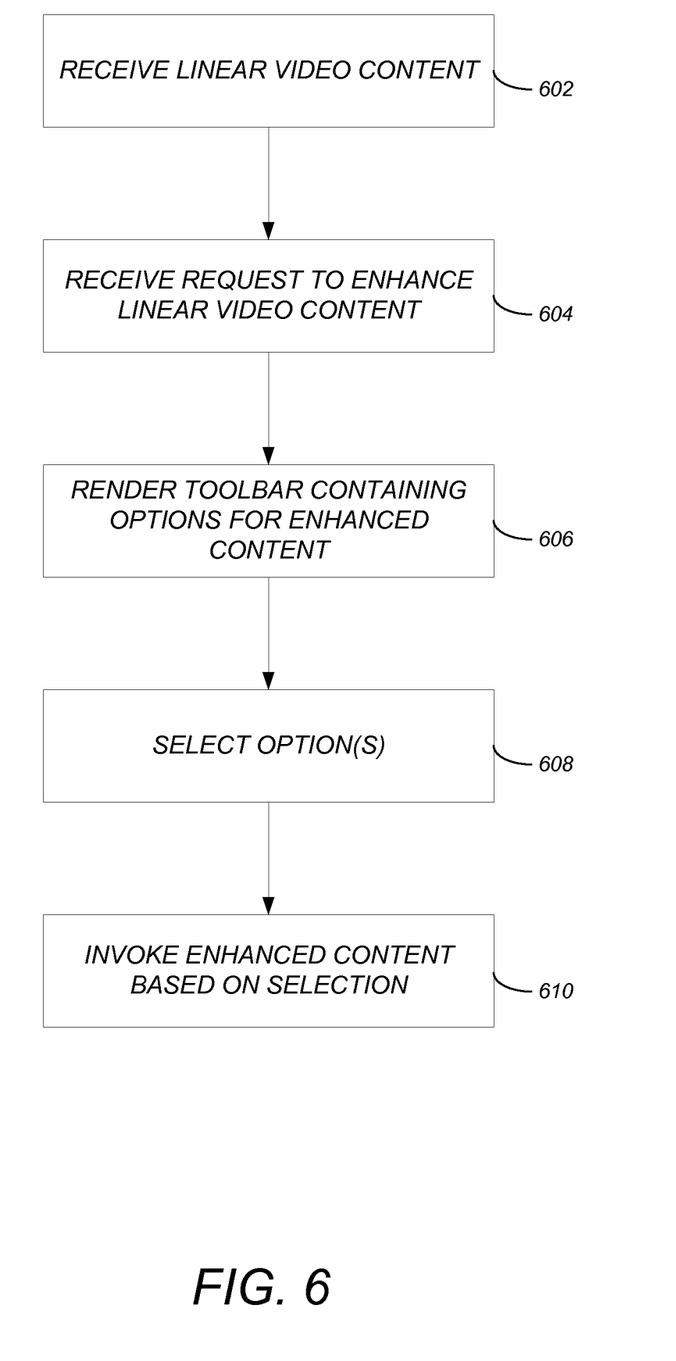
FIG. 6 illustrates the logical flow for enhancing linear video content in accordance with one or more embodiments of the invention.

FIG. 6 illustrates the logical flow for enhancing linear video content in accordance with one or more embodiments of the invention.

At step 602, linear video content is received (e.g., via broadcast, streaming, etc.). Such linear video content may be received into a computer, a television, a media receiver (e.g., a set top box), a cellular phone, a tablet device, etc.

At step 604, a request to enhance the linear video content is received. If the enhanced content is not available at the time the request is received, the request may trigger/cause/enable the creation of the enhanced content (e.g., a user creating a twitter feed that is associated with the content). The request may be received in response to a rendered prompt (wherein the prompt is a user dialog, pop-up, question, etc. that determines whether enhanced linear video content is desired). The rendering of the prompt may be triggered only when enhanced content is available for the linear video content. Further, the rendering of the prompt may be triggered based on a marker (e.g., a watermark, fingerprint, frame number, time, etc.) within the linear video content. Alternatively, the rendering of the prompt may be triggered based on user conduct with respect to the linear video content (e.g., detection of active viewing for a defined time period, viewing of a particular television show, whether a viewer's friends have also watched the linear video content, etc.).

At step 606, based on the request, a toolbar having options for enhanced content is rendered. Such a toolbar may be overlaid on top of the linear video content (e.g., transparently across the bottom off the linear video content, as a menu in the upper left, etc.). In one or more embodiments, the toolbar may be customized based on toolbar location, transparency, appearance, number of options, navigation within the toolbar, and/or actions invoked upon selection. Accordingly, a user/viewer and/or enhanced content creator may customize how the toolbar is presented with respect to particular linear video content. In this regard, a toolbar may have a specific association with a particular linear video content and/or may be generic for all linear video content or a category of linear video content. For example, one toolbar may be presented/associated with all television episodics, while a different toolbar may be presented/associated with feature films, while yet another toolbar may be presented with a subcategory (e.g., cartoon, drama, comedy, foreign, independent, etc.).

Users/toolbar creators may also have the option of publishing a toolbar. When published, the toolbar may be downloadable (e.g., publicly or to a set of authorized users depending on the publishing configurations defined) and associated with a set or particular enhanced content (that may also be downloadable and/or invoked in real-time as the linear video content is rendered/displayed.

At step 608, one or more of the options is selected.

At step 610, based on the selecting, the enhanced content is invoked simultaneously with a rendering of the linear video content. Such enhanced content may take many forms and may be presented/rendered/invoked in many different ways. For example, enhanced content may consist of data acquired from one or more data sources (e.g., IMDB™, media content review databases such as Rotten Tomatoes™, RollingStone™, MetaCritic™, etc.). The data from such databases/feeds may be ingested/normalized and mapped/associated with particular frames within the linear video content, times within the linear video content, etc. to determine where and when to display the data.

The enhanced content may also include web content such as a map (e.g., indicating a location where a particular item in the linear video content may be purchased, a website URL (uniform resource locator), images from a website, etc.). Alternatively, the enhanced content may consist of information from a social network stream (e.g., Twitter™, Instagram™ Facebook™, Myspace™, Snapchat™, Tumblr™, etc.). With a social network stream, the enhanced content may be identified via a hashtag ("#") or other identifier thereby enabling users to comment on and/or about the linear video content (e.g., in real-time while the content is being broadcast).

In yet another embodiment, the enhanced content may consist of bonus footage such as a director interview, alternative endings, etc. that may be selected by the user for viewing simultaneously/dynamically/in real-time with the linear video content. Alternatively, upon selection of enhanced content, such a selection may be stored and a listing of the selected enhanced content may be available upon completion/conclusion of the linear video content (e.g., after a television program has concluded).

Regardless of the type/format of enhanced content, embodiments of the invention enable the ability to overlay/composite such enhanced content with the linear video content (e.g., via an automated compositing application) in real-time based on the settings of the enhanced content (e.g., to be displayed at particular coordinates within or adjacent to a displayed image, at a particular time/frame within the linear video content, etc.). Such enhanced content may be interactive with one user, or may allow multiple users to simultaneously interact (e.g., users that have viewed or are simultaneously viewing the content [e.g., a social media network/twitter feed]). Further, the enhanced content may be stored/transmitted to other users for future use.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method comprising:
    causing output of video content;
    based on prior user viewing history, and during output of the video content, causing output of a prompt indicating that enhanced content, associated with the video content, is available;
    receiving, based on the prompt, first user input indicating a request to access the enhanced content;
    causing, based on the first user input, output of an indication of one or more enhanced content items associated with the video content;
    receiving second user input indicating a selection of an enhanced content item of the one or more enhanced content items; and
    causing, based on the second user input and during output of the video content, output of the enhanced content item.

2. The method of claim 1, wherein the one or more enhanced content items comprises one or more of:
    a review of the video content;
    cast information;
    a map;
    a social network feed;
    a website link;
    a search result;
    other video content associated with the video content; or
    other data associated with the video content.

3. The method of claim 1, wherein the method further comprises creating, based on the first user input, one or more of the one or more enhanced content items.

4. The method of claim 1, wherein the indication of the one or more enhanced content items comprises one or more icons associated with the one or more enhanced content items.

5. The method of claim 1, wherein the causing output of the indication of the one or more enhanced content items comprises causing the indication to be overlaid on top of the video content.

6. The method of claim 1, wherein the prior user viewing history comprises at least one of:
    user requests for output of the video content;
    a user request for output of other video content associated with the video content;
    one or more users, associated with a social media network, requesting output of the video content; or
    one or more users, associated with a social media network, having sent messages associated with the video content.

7. The method of claim 1, wherein the indication of the one or more enhanced content items comprises a toolbar and wherein the method further comprises customizing the toolbar based on at least one of:
    toolbar location;
    transparency;
    appearance;
    number of enhanced content items;
    navigation within the toolbar; or
    actions invoked upon the selection of the enhanced content item of the one or more enhanced content items.

8. The method of claim 1, wherein the method further comprises causing the indication of the one or more enhanced content items to be accessible to a plurality of users.

9. The method of claim 8, wherein the causing the indication of the one or more enhanced content items to be accessible to the plurality of users comprises uploading the indication of the one or more enhanced content items to a service configured to provide the plurality of users access to the indication.

10. An apparatus comprising:
    one or more processors; and
    memory storing instructions that, when executed by the one or more processors, cause the device to:

cause output of video content;
based on prior user viewing history, and during output of the video content, cause output of a prompt indicating that enhanced content, associated with the video content, is available;
receive, based on the prompt, first user input indicating a request to access the enhanced content;
cause, based on the first user input, output of an indication of one or more enhanced content items associated with the video content;
receive second user input indicating a selection of an enhanced content item of the one or more enhanced content items; and
cause, based on the second user input and during output of the video content, output of the enhanced content item.

11. The apparatus of claim 10, wherein the one or more enhanced content items comprises one or more of:
a review of the video content;
cast information;
a map;
a social network feed;
a website link;
a search result;
other video content associated with the video content; or
other data associated with the video content.

12. The apparatus of claim 10, wherein the instructions, when executed by the one or more processors, further cause the device to create, based on the first user input, one or more of the one or more enhanced content items.

13. The apparatus of claim 10, wherein the indication of the one or more enhanced content items comprises one or more icons associated with the one or more enhanced content items.

14. The apparatus of claim 10, wherein the instructions that, when executed by the one or more processors, cause the device to cause output of the indication of the one or more enhanced content items, cause the device to cause the indication to be overlaid on top of the video content.

15. The apparatus of claim 10, wherein the prior using viewing history comprises at least one of:
user requests for output of the video content;
a user request for output of other video content associated with the video content;
one or more users, associated with a social media network, requesting output of the video content; or
one or more users, associated with a social media network, having sent messages associated with the video content.

16. The apparatus of claim 10, wherein the indication of the one or more enhanced content items comprises a toolbar, and wherein the instructions, when executed by the one or more processors, further cause the device to customize the toolbar based on at least one of:
toolbar location;
transparency;
appearance;
number of enhanced content items;
navigation within the toolbar; or
actions invoked upon the selection of the enhanced content item of the one or more enhanced content items.

17. The apparatus of claim 10, wherein the instructions, when executed by the one or more processors, further cause the device to cause the indication of the one or more enhanced content items to be accessible to a plurality of users.

18. The apparatus of claim 17, wherein the instructions that, when executed by the one or more processors, cause the device to cause the indication of the one or more enhanced content items to be accessible to the plurality of users, cause the device to upload the indication of the one or more enhanced content items to a service configured to provide the plurality of users access to the indication.

19. A non-transitory computer-readable medium storing instructions that when executed, cause:
causing output of video content;
based on prior user viewing history, and during output of the video content, causing output of a prompt indicating that enhanced content, associated with the video content, is available;
receiving, based on the prompt, first user input indicating a request to access the enhanced content;
causing, based on the first user input, output of an indication of one or more enhanced content items associated with the video content;
receiving second user input indicating a selection of an enhanced content item of the one or more enhanced content items; and
causing, based on the second user input and during output of the video content, output of the enhanced content item.

20. The non-transitory computer-readable medium of claim 19, wherein the one or more enhanced content items comprises one or more of:
a review of the video content;
cast information;
a map;
a social network feed;
a website link;
a search result;
other video content associated with the video content; or
other data associated with the video content.

21. The non-transitory computer-readable medium of claim 19, wherein the instructions, when executed, further cause creating, based on the first user input, one or more of the one or more enhanced content items.

22. The non-transitory computer-readable medium of claim 19, wherein the indication of the one or more enhanced content items comprises one or more icons associated with the one or more enhanced content items.

23. The non-transitory computer-readable medium of claim 19 wherein the instructions that, when executed, cause causing output of the indication of the one or more enhanced content items, cause causing the indication to be overlaid on top of the video content.

24. The non-transitory computer-readable medium of claim 19, wherein the prior user viewing history comprises at least one of:
user requests for output of the video content;
a user request for output of other video content associated with the video content;
one or more users, associated with a social media network, requesting output of the video content; or
one or more users, associated with a social media network, having sent messages associated with the video content.

25. The non-transitory computer-readable medium of claim 19, wherein the indication of the one or more enhanced content items comprises a toolbar, and wherein the instructions, when executed, further cause customizing the toolbar based on at least one of:
toolbar location;
transparency;

appearance;

number of enhanced content items;

navigation within the toolbar; or actions invoked upon the selection of the enhanced content item of the one or more enhanced content items.

26. The non-transitory computer-readable medium of claim 19, wherein the instructions, when executed, further cause causing the indication of the one or more enhanced content items to be accessible to a plurality of users.

27. The non-transitory computer-readable medium of claim 26, wherein the instructions that, when executed by the one or more processors, cause causing the indication of the one or more enhanced content items to be accessible to the plurality of users, cause uploading the indication of the one or more enhanced content items to a service configured to provide the plurality of users access to the indication.

* * * * *